Figure 1:
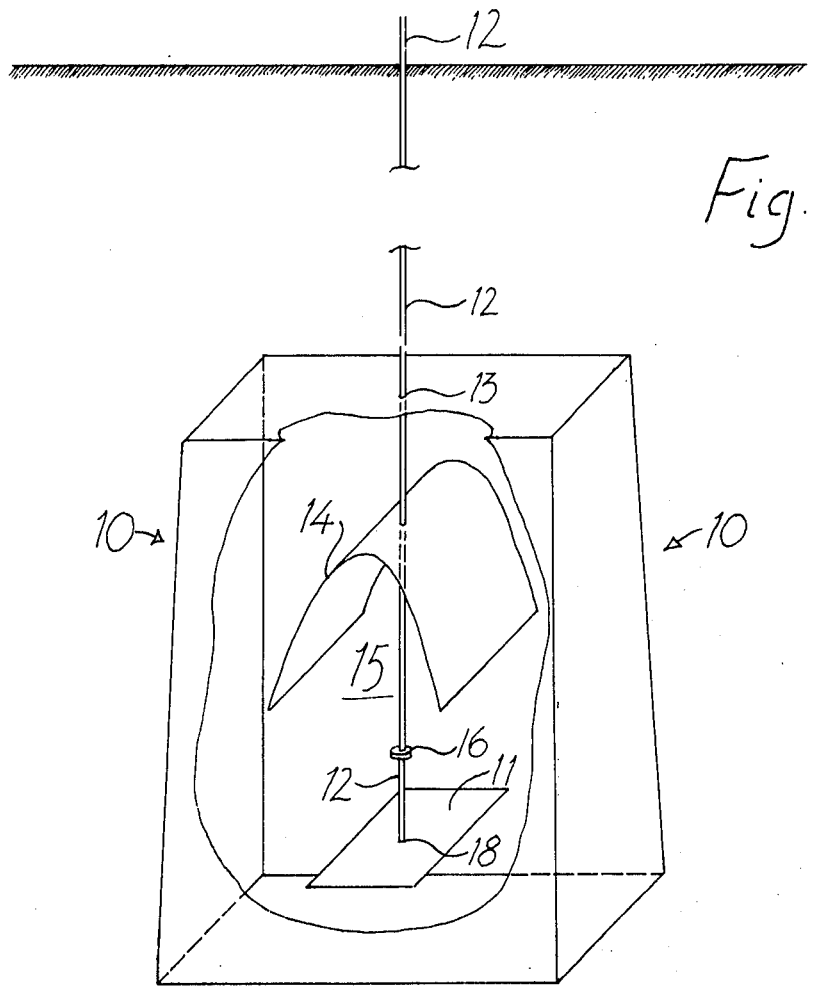

United States Patent [19]

Malmqvist et al.

[11] 4,426,575
[45] Jan. 17, 1984

[54] METHOD AND APPARATUS FOR MEASURING RADON IN THE GROUND

[75] Inventors: Erik L. Malmqvist, Skellefteå; Krister Kristiansson, Lund, both of Sweden

[73] Assignee: Boliden Aktiebolag, Stockholm, Sweden

[21] Appl. No.: 307,278

[22] Filed: Sep. 30, 1981

[30] Foreign Application Priority Data

Oct. 20, 1980 [SE] Sweden ................................ 8007337

[51] Int. Cl.³ .......................... G01V 5/00; G01N 5/00
[52] U.S. Cl. .................................... 250/253; 250/474.1
[58] Field of Search ............... 250/253, 254, 255, 256, 250/472.1, 473.1, 474.1

[56] References Cited

U.S. PATENT DOCUMENTS

| | | | |
|---|---|---|---|
| 3,665,194 | 5/1972 | Alter et al. | 250/253 |
| 4,179,614 | 12/1979 | Felice et al. | 250/253 |
| 4,186,303 | 1/1980 | Smith et al. | 250/253 |
| 4,297,574 | 10/1981 | Card et al. | 250/253 |

*Primary Examiner*—Janice A. Howell
*Attorney, Agent, or Firm*—Stevens, Davis, Miller & Mosher

[57] ABSTRACT

The invention relates to a method of measuring the concentration of radon and radon daughters in the ground, particularly at great depth and/or below the ground-water level. In accordance with the invention a detector is freely suspended from a wire and placed in a container intended for collecting gas rising up from the ground. The container is buried at a desired depth beneath the surface of the ground and the detector is exposed to the gas in the container over a given period of time. Subsequent to this exposure period, the detector is drawn up by means of the wire, together with a sleeve, protecting the detector from contact with surrounding ground, through the roof of the container and up through the ground, to a location so selected that the registered contents of radon and radon daughters can then be determined on the basis of the data registered on the detector. The invention also relates to preferred apparatus for carrying out the method.

11 Claims, 2 Drawing Figures

METHOD AND APPARATUS FOR MEASURING RADON IN THE GROUND

The present invention relates to a method for measuring the concentration of radon and radon daughters in the ground. The method relates in particular to measuring the concentration of radon and radon daughters at great depth and/or below the ground-water level. The invention also relates to apparatus for carrying out the method.

In buildings erected on ground in which the ground-air contains large quantities of radon there is a risk that people present in such buildings will be dangerously exposed to radiation from radon and radon daughters. Consequently, when planning the erection of a building on a particular piece of ground it is desirable to measure the radon content of the ground-air, so that measures can be taken to prevent the occurrence of unacceptably high levels of radon and radon daughters in the finished building.

Many different types of instruments for measuring radon and radon daughter products are known to the art. One group of instruments comprises especially designed ionisation chambers, scintillation counters and semi-conductor detectors, with associated electronic equipment. These instruments are comparatively expensive and require the presence of a specialist at each measuring operation. Another type of detector comprises photographic film or certain type of track detectors made of a plastics film. Because of their design simpicity, sensitivity and low price, plastics film detectors have been found particularly suited for measuring alpha radiation from radon and radon daughters in the air over long periods of time. One such detector means is the unprotected cellulose nitrate film which can be used for registering the total radiation from radon and radon daughters; and also for taking measurements in the ground and in mines.

The use of cellulose nitrate plastics for detecting radon is described, inter alia, in U.S. Pat. No. 3,665,194. The concentration of radon in the ground is measured in a manner described in the aforementioned U.S. patent, either with electronic detectors, spotwise in time and space, down to a depth of less than 0.5 m, or with a naked cellulose nitrate film in an inversally positioned cup-like body over periods of about one month. The electronic detectors are also seriously limited, since they need constant care, and hence they are not attractive for practical use. The cup-like bodies with said naked cellulose nitrate film, described in the previously mentioned U.S. patent, must be dug from the ground subsequent to the film being exposed. This restricts the use of said cup-like bodies in practise to a depth of less than 1 m.

Tests and research carried out by us have indicated, however, that the depth-dependency of radon concentration is such as to make it desirable to know the radon concentration even at greater depths, if it is to be possible to evaluate the risks involving radon when building on radon-contaminated ground.

Consequently, an object of the present invention is to provide a method and apparatus with which the radon concentration in the ground can be measured with the use of track detectors at greater depths than those mentioned above, without requiring the exposed detector to be dug out of the ground.

To this end there is provided a method and an apparatus whose characterizing features are set forth in the following claims.

Figure 2:
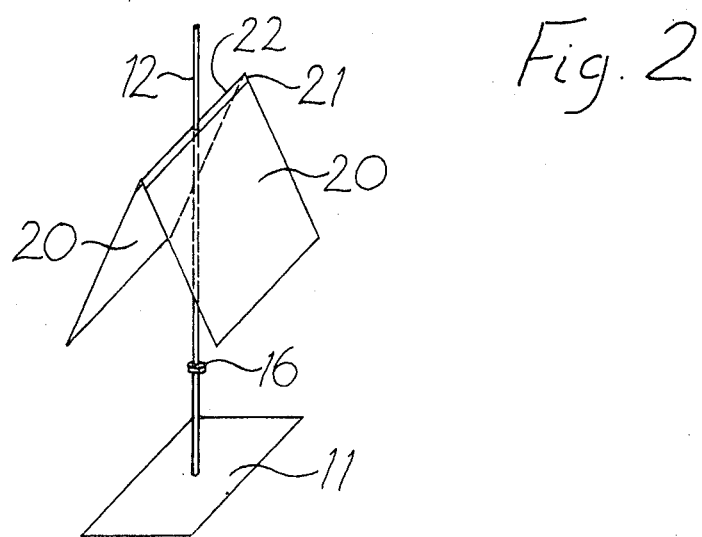

The invention will now be described in more detail with reference to the accompanying drawing, in which FIG. 1 is a perspective view of a preferred embodiment of the apparatus according to the invention, located on its measuring site; and FIG. 2 illustrates a further embodiment of a part of said apparatus.

The apparatus in FIG. 1 comprises a downwardly open exposure-container 10, located at a desired depth beneath the surface of the ground. Arranged in the container 10 is a film-type detector 11, for measuring the radon content. The detector 11 is attached at 18 to a wire 12 such as to be freely suspended from said wire. The wire 12 can be caused to communicate with the surface of the ground through a water-tight lead-through 13 arranged in the roof of the container 10. A protective sleeve 14 is arranged on the wire 12, so that the detector 11 can be drawn up with the wire 12 in a chamber 15 defined substantially by the sleeve 14. A stop means 16 is arranged on the wire 12, so that relative movement between wire 12 and sleeve 14 can be stopped at a desired position, when the wire 12 is drawn up through the container. The detector 11 preferably comprises a cellulose nitrate film able to register the alpha radiation from radon and radon daughters. The film may be a naked film or may be covered with a further plastics film, the thickness of which is sufficient to protect the detector 11 without preventing registration of alpha particles from radon and radon daughters when these disintegrate in a volume of air present in front of the detector 11. The protecting film is so thin that radiation from radon daughters cannot be registered on the plastics surface. The detector 11 is placed in the container 10 during the exposure period. A withdrawal means comprising the wire 12, the sleeve 14 and the stop means 16 enables the exposed film to be drawn up in an undamaged state without it being necessary to remove the container with the exposed film from the ground. The container 10 is suitably manufactured of a material which can readily be broken by the sleeve 14 of the withdrawal arrangement, but which is substantially non-permeable to the ground-air. During the exposure period, the detector 11, with the cellulose nitrate film, is freely suspended in the exposure container 10. The detector 11 is fixed to the wire 12, which is drawn through the sleeve 14 and through the water-tight lead-through 13 in the bottom of the inverse container 10, up to the surface of the ground. The lead-through 13 in the bottom of the container 10 is sealed, so that air or water is unable to pass through said lead-through. When withdrawing the detector 11, said detector is drawn up in a first stage into the space 15 defined by the wall of the sleeve 14, until the stop means 16 arranged on the wire 12 obstructs further withdrawal. As withdrawal of the wire 12 from the surface of the ground continues, the sleeve 14, which is suitably pointed, passes through the bottom of the container and is then drawn up through the surface of the ground, the sleeve 14 protecting the detector 11 from contact with surrounding earth during said withdrawal. The sleeve 14 may have various forms. The main function of the sleeve is to protect the exposed film during withdrawal. It shall be so designed as not to prevent or disturb exposure, and such as to enable it to be drawn through the bottom of the inverse exposure container. It may be a conical or straight sleeve, a U-shaped metal plate or two plates or pieces joined together by means of a hinge-like device which is folded together during the withdrawal operation. FIG. 2 illustrates a suitable embodiment in which the sleeve 14 comprises two rectangular elements 20 joined together by means of a hinge device 21, along a respective one edge 22 of the elements 20.

The apparatus illustrated in FIG. 1 can be modified for measuring the concentration of radon and radon-daughters in the vicinity of or below the ground-water level. The dimensions of the container 10 shall be such that the air pressure therein prevents the water level from reaching the cellulose nitrate detector 11. The distance between the detector 11 and the surface of said water shall be such as to ensure that registration of alpha particles is not disturbed.

I claim:

1. A method of measuring the concentration of radon and radon daughters in the ground, especially at great depths, and/or below the ground-water level, using film-type track detectors, comprising freely suspending the detector from a wire and placing the detector in a container intended for collecting gas rising from the ground; burying the container to a desired depth beneath the surface of the ground; permitting the detector to be exposed to gas in the container over a given length of time; withdrawing the detector with the aid of said wire and a sleeve which protects the detector from contact with surrounding earth; said detector being drawn up through the roof of the container and up through the ground to a location so selected that the radon and radon daughter concentration can then be determined in a known manner on the basis of the measurements registered on the detector film.

2. A method according to claim 1, including arranging a protective film over the detector film prior to priming said film for use.

3. A method according to claim 1 or claim 2 for measuring radon and radon-daughter concentration in the vicinity of or beneath the surface of ground-water, including selecting the dimensions of the container so that the air pressure prevailing in said container prevents the level of the water from approaching so close to the detector as to disturb the registration of alpha particles.

4. An apparatus for measuring the concentration of radon and radon daughters in the ground comprising film-type track detector; a container intended for use beneath the level of the ground and comprising substantially a gas impermeable material for collecting gas passing from below; a protective sleeve arranged to protect said detector; and a wire from which the detector is suspended within the container and which is arranged to be drawn through an opening in the sleeve and in the roof of the container, up through the ground to a location from which the detector can be drawn up with the aid of the wire.

5. An apparatus according to claim 4, characterized in that the sleeve is of conical configuration.

6. An apparatus according to claim 4 or 5 including a stop means arranged on said wire such as to prevent withdrawal of the detector through the sleeve during said withdrawal operation.

7. An apparatus according to claim 4 or 5 wherein said opening arranged in the roof of the container is sealed against the passage of air and water therethrough.

8. An apparatus according to claim 4 or 5 wherein said container comprises an inverse cup-like vessel manufactured from a relatively easily broken material.

9. An apparatus according to claim 4 wherein said sleeve is of cylindrical configuration.

10. An apparatus according to claim 4 wherein said sleeve comprises a U-shaped metal plate.

11. An apparatus according to claim 4 wherein said sleeve comprises elements which are connected together by means of a hinge-like device and which are urged together during said withdrawal operation.

* * * * *